(12) United States Patent
Katagiri et al.

(10) Patent No.: US 6,656,620 B2
(45) Date of Patent: Dec. 2, 2003

(54) HUMIDIFICATION SYSTEM FOR A FUEL CELL

(75) Inventors: Toshikatsu Katagiri, Wako (JP); Hiroshi Shimanuki, Wako (JP); Motohiro Suzuki, Wako (JP); Yoshio Kusano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 126 days.

(21) Appl. No.: 09/774,375

(22) Filed: Jan. 30, 2001

(65) Prior Publication Data

US 2001/0010875 A1 Aug. 2, 2001

(30) Foreign Application Priority Data

Jan. 31, 2000 (JP) .......................................... 2000-023223
Jan. 31, 2000 (JP) .......................................... 2000-023224

(51) Int. Cl.⁷ .............................................. H01M 8/04
(52) U.S. Cl. ............................ 429/26; 429/20; 429/22
(58) Field of Search ........................ 429/20, 13, 19, 429/26, 12, 17, 22

(56) References Cited

U.S. PATENT DOCUMENTS

| | | | | |
|---|---|---|---|---|
| 4,473,622 A | * | 9/1984 | Chludzinski et al. | 429/19 |
| 5,401,589 A | * | 3/1995 | Palmer et al. | 429/13 |
| 5,965,288 A | * | 10/1999 | Okamoto | 429/26 |
| 6,103,411 A | * | 8/2000 | Matsubayashi et al. | 429/17 |
| 6,106,964 A | * | 8/2000 | Voss et al. | 429/20 |
| 6,296,959 B2 | * | 10/2001 | Takabe et al. | 429/26 |
| 6,379,829 B1 | * | 4/2002 | Kurita | 429/17 |

FOREIGN PATENT DOCUMENTS

| | | |
|---|---|---|
| JP | 63-18304 | 4/1988 |
| JP | 6-132038 | 5/1994 |

* cited by examiner

Primary Examiner—Randy Gulakowski
Assistant Examiner—Monique Wills
(74) Attorney, Agent, or Firm—Lahive & Cockfield, LLP

(57) ABSTRACT

The humidification system for humidifying a fuel cell of the present invention comprises: a water-permeable-type humidifier for humidifying reaction gas used in reaction with moisture in exhaust gas exhausted after the reaction; and an adjuster for adjusting an amount of humidification to the humidification amount required by the fuel cell.

11 Claims, 7 Drawing Sheets

HUMIDIFICATION SYSTEM FOR A FUEL CELL

BACKGROUND OF THE INVENTION

1. Field of the Invention

The present invention relates to a humidification system for a fuel cell which utilizes a solid high polymer membrane as an electrolyte membrane, and which is employed in a fuel cell vehicle, and in particular, to a fuel cell humidification system with a water-permeable-type humidifier and to a fuel cell humidification system using a water-permeable-type humidifier as a heat exchanger.

2. Description of the Related Art

Conventionally, a fuel cell provided with a solid polymer membrane is known. In such a type of fuel cell, the generation of electricity is carried out by electrons, generated by a chemical reaction between externally supplied oxygen and hydrogen, and which flow in the solid polymer membrane. In order to conduct efficient electrical generation, the solid polymer membrane should be highly conductive, to make that resistance to the movement of the electrons generated by the reaction should be sufficiently low.

The reaction in the fuel cell generates water, and thus exhaust gas exhausted from the fuel cell after the reaction contains a considerable amount of moisture. Accordingly, as disclosed in Japanese Unexamined Patent Application. First Publication No. Hei 6-132038, a humidifier for humidifying a reaction gas used for the reaction in the fuel cell has been proposed by applying the exhaust gas exhausted after the reaction to the humidification gas.

Although the conventional fuel cell humidification system is advantageous in efficiently utilizing the exhaust gas, the problem arises in this humidification system that, since the exhaust gas contains a large amount of moisture, the moisture content within the fuel cell becomes rich as the reaction gas is humidified by the exhaust gas. As a result, the moisture condenses into dew in the spaces between the solid high polymer membranes in the fuel cell, thereby disadvantageously clogging the gas passage, and decreasing the generation performance.

Further, with the fuel cell, in order to conduct the efficient electricity generation, the recommended driving temperature of the fuel cell should be set to a predetermined temperature depending on the output. When the temperature is above this predetermined temperature, the solid polymer membrane may be damaged. When the temperature is below that predetermined temperature, the moisture collects between the solid high polymer membranes due to the dew condensation and the catalytic inactivation, thereby clogging the membranes, and decreasing the generation performance.

Conventionally, to set the inlet gas temperature to the driving temperature, a heat exchanger through which cooling water flows cools the gas at the inlet, thereby maintaining the inside of the fuel cell below the suitable temperature.

However, a conventional system using the heat exchanger for reducing the inlet gas temperature requires a comparatively large heat exchanger, radiator fan, and cooling water pump, has increased electric power consumption, and occupies a large space. Further, these various parts disadvantageously increase the weight of the vehicle.

Furthermore, to make the solid polymer membrane highly conductive to reduce resistance to the movement of the electrons generated by the reaction, the fuel cell requires humidification of the inlet gas.

BRIEF SUMMARY OF THE INVENTION

It is therefore an object of the present invention to provide a fuel cell humidification system which can humidify the reaction gas depending on a dew point command.

It is another object of the present invention to provide a fuel cell humidification system which can effectively utilize a humidifier for humidifying the inlet gas to the fuel cell, and which can maintain the inlet gas for operating the fuel cell at a suitable temperature.

In the first aspect of the present invention, the humidification system for humidifying a fuel cell comprises: a water-permeable-type humidifier for humidifying a reaction gas used in a reaction with moisture in an exhaust gas exhausted after the reaction; and an adjuster for adjusting an amount of humidification to a humidification amount required by the fuel cell.

The first aspect of the present invention increases the ratio of the reaction gas which flows through the humidifier to all of the reaction gas supplied to the fuel cell, or increases the ratio of the exhaust gas which flows through the humidifier to all of the exhaust gas exhausted from the fuel cell. By means of this, the amount of humidification can be increased depending on the amount of humidification required by the fuel cell. Further, the first aspect of the present invention deceases the ratio of the reaction gas which flows through the humidifier to all of the reaction gas supplied to the fuel cell, or decreases the ratio of the exhaust gas which flows through the humidifier to all of the exhaust gas exhausted from the fuel cell. By means of this, the amount of humidification can be decreased depending on the amount of humidification required by the fuel cell. Thus, the appropriate humidification conditions of the fuel cell can be maintained, and the fuel cell can be used most efficiently.

In the second aspect of the present invention, the humidification system further comprises: a reaction gas supply passage from the humidifier to the fuel cell; and a reaction gas bypass passage, connected to the reaction gas supply passage, for allowing the reaction gas to bypass the humidifier and for controlling an amount of gas flow.

According to the second aspect of the present invention, as the amount of the reaction gas flowing through the reaction gas bypass passage is increased, the amount of the humidified gas in all of the reaction gas supplied to the fuel cell can be relatively decreased. As the amount of the reaction gas flowing through the reaction gas bypass passage is decreased, the amount of the humidified gas in all of the reaction gas supplied to the fuel cell can be relatively increased. Thus, the amount of the reaction gas flowing through the reaction gas bypass passage is controlled depending on the amount of humidification required by the fuel cell, and the fuel cell can be used most efficiently.

In a third aspect of the present invention, the humidification system further comprises: an exhaust gas discharge passage from the fuel cell through the humidifier; and a reaction gas bypass passage, connected to the exhaust gas discharge passage, for allowing the exhaust gas to bypass the humidifier and for controlling the amount of gas flow.

According to the third aspect of the present invention, as the amount of the exhaust gas flowing through the exhaust gas bypass passage is increased, the amount of the exhaust gas, which flows through the humidifier to humidify the reaction gas in all of the exhaust gas exhausted from the fuel cell is relatively decreased. As the amount of the exhaust gas flowing through the exhaust gas bypass passage is decreased, the amount of the exhaust gas which flows through the humidifier to humidify the reaction gas, in all of the exhaust gas exhausted from the fuel cell is relatively increased. Thus, the amount of the exhaust gas flowing through the exhaust gas bypass passage is controlled depending on the amount of humidification required by the fuel cell, and the fuel cell can be used most efficiently.

In a fourth aspect of the present invention, a humidification system for humidifying a fuel cell comprises: a humidifier for extracting moisture from gas exhausted from the fuel cell and for supplying the moisture to an inlet gas for operating the fuel cell; and an adjuster for adjusting a pressure or flow of the exhausted or inlet gas passing through the humidifier to control the temperature of an entering gas.

According to the fourth aspect of the present invention, the inlet gas supplied to the fuel cell and the gas exhausted from the fuel cell are supplied to the humidifier which conducts the heat exchange between the exhausted gas and the inlet gas. Therefore, as the pressure of the inlet gas to the fuel cell is increased, or as the amount of flow of the inlet gas is decreased, the temperature of the inlet gas is increased. As the pressure of the inlet gas to the fuel cell is decreased, or as the amount of flow of the inlet gas is increased, the temperature of the inlet gas is decreased. Thus, the humidification system does not require a heat exchanger, and effectively utilizes the humidifier to suitably adjust the temperature of the inlet gas supplied to the fuel cell.

Further, as compared with the conventional system with a heat exchanger, the space required for the system can be decreased, and the weight of the vehicle is not significantly increased.

DETAILED DESCRIPTION OF THE INVENTION

Hereinafter, the first embodiment of the present invention will be explained in the following.

Figure 1:
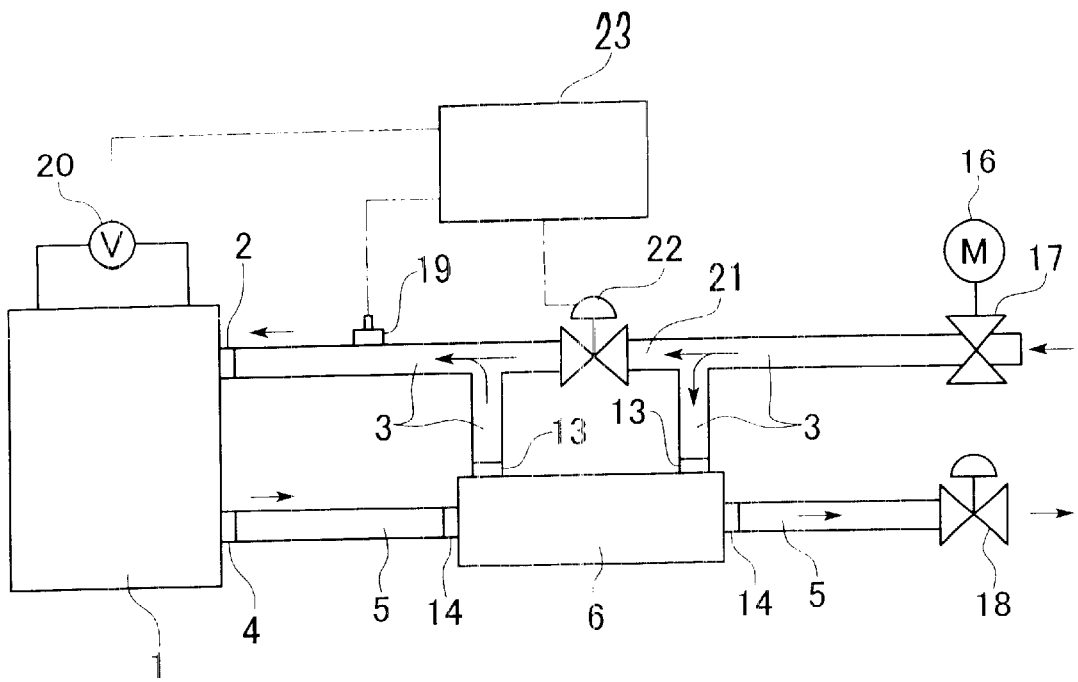
FIG. 1 is a schematic diagram showing the first embodiment of the present invention.

FIG. 1 schematically shows the fuel cell humidification system of the present invention. The fuel cell humidification system is utilized, for example, in a fuel cell vehicle.

In FIG. 1, reference numeral 1 denotes the fuel cell. The fuel cell 1 comprises a number of solid polymer membranes which function as a solid electrolyte by proton exchange groups present in the polymer molecules when the solid polymer membranes are saturated with water, while each solid polymer membrane separates, for example, oxygen and hydrogen. The humidification system humidifies the solid polymer membranes to increase the conductivity.

A reaction gas supply passage 3 for supplying reaction gas used in the reaction (air, or hydrogen gas) is connected to a gas inlet 2 of the fuel cell 1. An exhaust gas discharge passage 5 for exhausting the exhaust gas (off gas) after the reaction from the fuel cell 1 is connected to a gas outlet 4 of the fuel cell 1. The gas used in the reaction in the fuel cell 1 is oxygen in the supplied air, or separately supplied hydrogen, and the case of using air will be explained.

The humidifier 6 for humidifying the air which is the reaction gas with the moisture in the exhaust gas is provided between the reaction gas supply passage 3 and the exhaust gas discharge passage 5.

Figure 2:
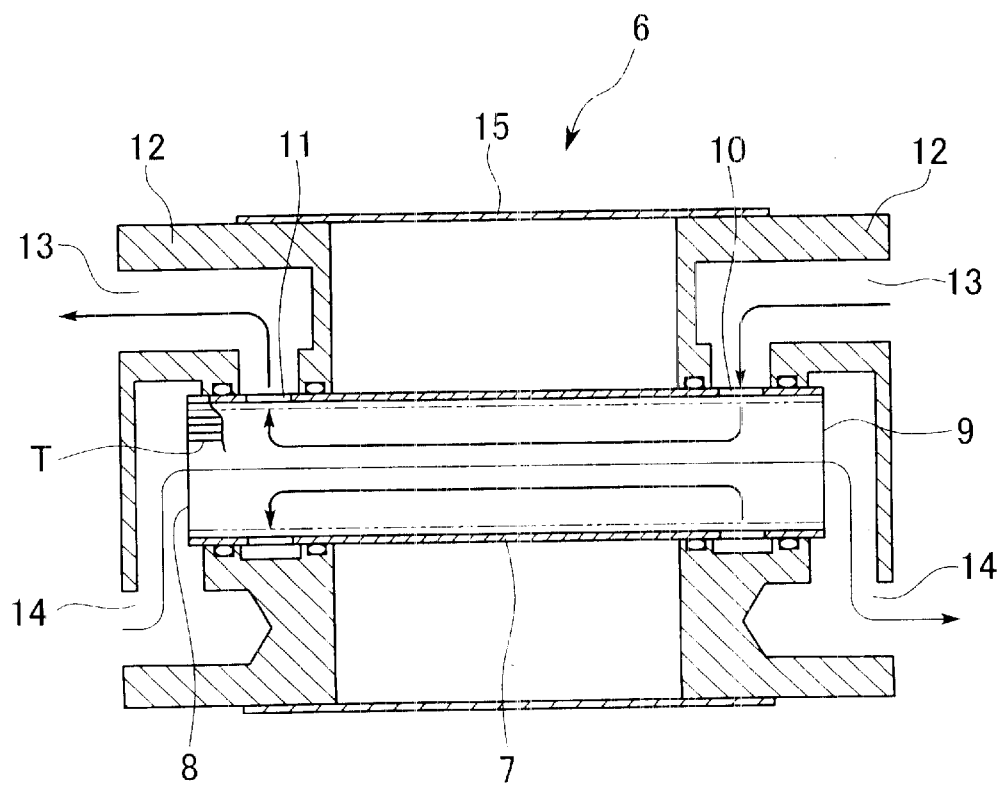
FIG. 2 is a schematic diagram showing the humidifier in the embodiments.

FIG. 2 is a schematic diagram showing the humidifier 6. In FIG. 2, a number of hollow strings T (porous hollow strings made of a water permeable membrane) are densely bundled and are inserted in a cylindrical casing 7, and one end of the casing 7 is constituted as the exhaust gas inlet 8, and the other end is constituted as an exhaust gas outlet 9. At the side wall of the casing 7, an air inlet 10 and an air outlet 11 are formed, and the air inlet 10 and the air outlet 11 are communicated with spaces between the hollow strings T in the casing 7.

Heads 12 and 12 are attached at both ends of the casing 7 at positions such that they cover the reaction gas inlet 10 and the reaction gas outlet 11. The reaction gas ports 13 are connected to the reaction gas inlet 10 and the reaction gas outlet 11, and the exhaust gas ports 14 are connected to the exhaust gas inlet 8 and exhaust gas outlet 9. Here, a cover 15 is provided between the heads 12 so as to cover the casing 7. The reaction gas ports 13 of the humidifier 6 are connected to the dry air supply passage 3, and the exhaust gas ports 14 are connected to the exhaust gas discharge passage 5. It is noted that one humidifier 6 can be provided with a plurality of casings 7 and that the number of hollow strings can be suitably determined according to the capacity of the fuel cell. It is also noted that the position of the reaction gas port 13 is illustrated in FIG. 2 differently from that of the reaction gas port 13 in FIG. 1, for purpose of illustration.

Accordingly, when humidified exhaust gas is supplied to each hollow string membrane from the exhaust gas port 14 at one end of the casing 7, moisture is condensed in capillaries formed in the hollow string membrane (according to Kelvin's capillary condensation equation), and the water is separated and permeates the hollow string membrane. This permeated water humidifies dry air supplied from the air port 13 when it contacts the permeated water. As a result, the dry air discharged from the air port 14 at the other end of the casing 7 is humidified.

As shown in FIG. 1, a supercharger 17 driven by a motor 16 is provided in the dry air supply passage 3 at upstream of the humidifier 6. This supercharger 17 is used for supplying external air into the fuel cell 1. A pressure regulating valve 18 is provided in the exhaust gas discharge passage 5 at downstream of the humidifier 6. This pressure regulating valve 18 is used for regulating the pressure in the system.

A dew point instrument 19 for measuring the dew point of the dry air supplied to the fuel cell 1 is provided in the reaction supply passage 3 between the humidifier 6 and the gas inlet 2 of the fuel cell 1. A voltmeter 20 for measuring the voltages of the respective hollow string membranes is provided in the fuel cell 1.

A reaction gas by-pass passage 21 for allowing the gas to bypass the humidifier 6 is provided in the reaction gas supply passage 3 from the humidifier 6 to the fuel cell 1. A flow regulating valve 22 is attached to this reaction gas bypass passage 21 for regulating the amount of flow of the bypassing reaction gas. The flow regulating valve 22, the dew point instrument 19, and the voltmeter 20 are connected to a controller 23.

The dew point control of the humidified reaction gas of the first embodiment will be explained with reference to the flowchart of FIG. 3.

In step S1, it is determined whether the cell voltage (measured by the voltmeter 20), which is the voltage of the solid polymer membranes in the fuel cell 1, is above a threshold value V. When the cell voltage is above the threshold value V, the flow proceeds to step S2. When the cell voltage is equal to or below the threshold value V, the flow proceeds to step S3.

The reason for the determination based on the cell voltage is as follows.

When the inside of the fuel cell 1 is humidified, once dew condenses in the fuel cell 1, the dew point is decreased, and a different map (for a low-dew-point operation) must be referred to.

In steps S2 and S3, the dew point is looked up in a map at that time. While a normal dew point map is used in step S2, a low dew point map is used in step S3.

The flow proceeds to step S4, and it is determined whether the present dew point looked up in step S2 or S3 is above a threshold value SV (e.g., the dew point of 50–70° C. when the output is 10–60 kw which is a required humidification amount for the fuel cell 1).

When the present dew point is above the threshold value SV in step S4, the flow regulating valve 22 is opened to decrease the dew point in step S5. Thus, because the amount of the dry air supplied to the fuel cell 1 is increased, the relative amount of the dry air passing through the humidifier 6 is decreased, thereby reducing the dew point. When present dew point is equal to or below the threshold value SV in step S4, the flow regulating valve 2 is closed to increase the dew point in step S6. Thus, because the amount of the dry air passing through the humidifier 6 is increased, the relative amount of the dry air supplied to the fuel cell 1 is decreased, thereby raising the dew point.

This operation is repeated, and the amount of the dry air which flows through the reaction gas bypass passage 21 is regulated. Thus, the amount of the dry air which flows through the humidifier 6 is increased or decreased so as to appropriately maintain the dew point (requested dew point), and the fuel cell 1 is operated under the optimized conditions, preventing dew condensation in the fuel cell 1 and preventing a decrease in the generation performance.

Because the embodiment efficiently utilizes the moisture in the exhaust gas exhausted from the fuel cell 1 and supplies the gas to the fuel cell 1, the exhausted moisture can be advantageously decreased. Therefore, the apparatus is suitable for a fuel cell vehicle whose loading space is limited.

Figure 4:
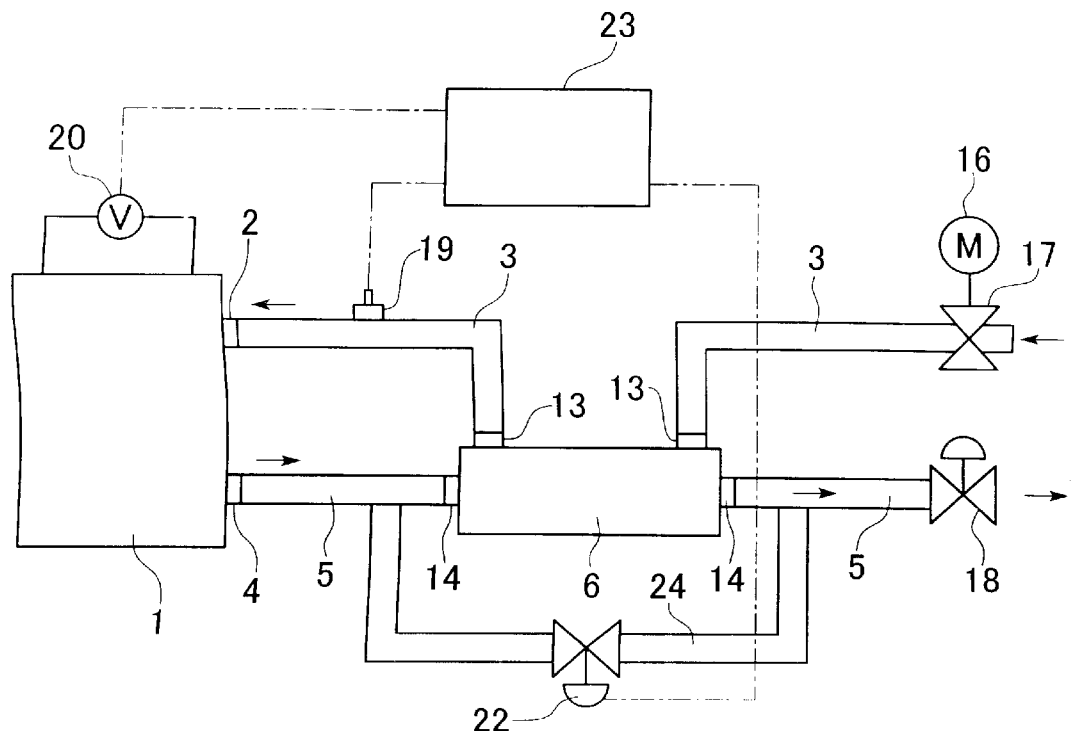
FIG. 4 is a schematic diagram showing the second embodiment of the present invention.
Figure 5:
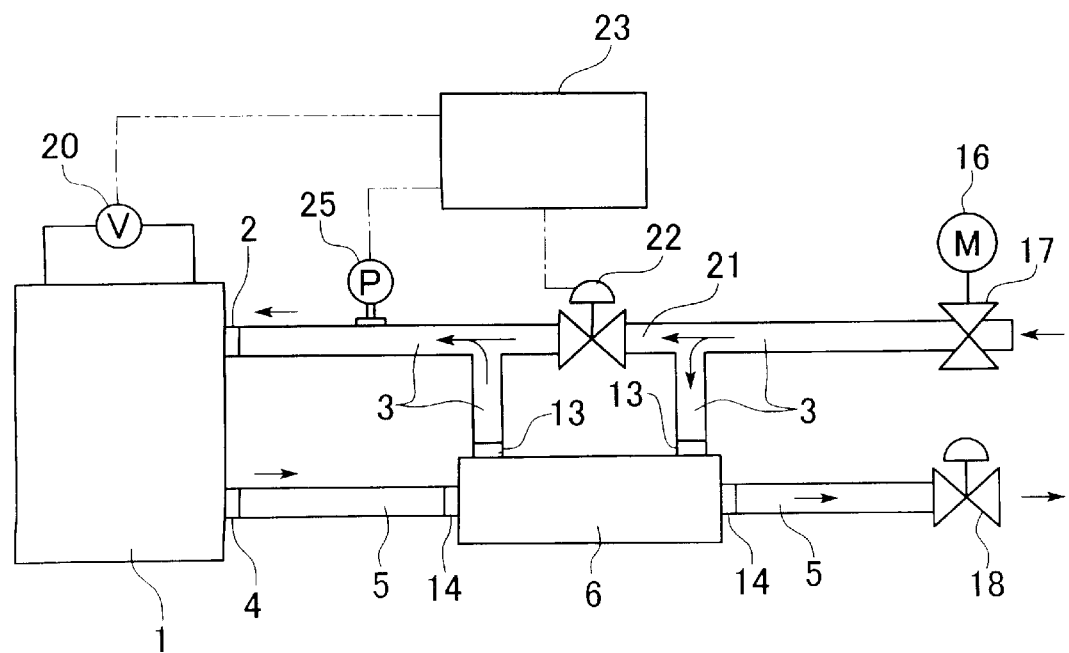
FIG. 5 is a schematic diagram showing the third embodiment of the present invention.
Figure 6:
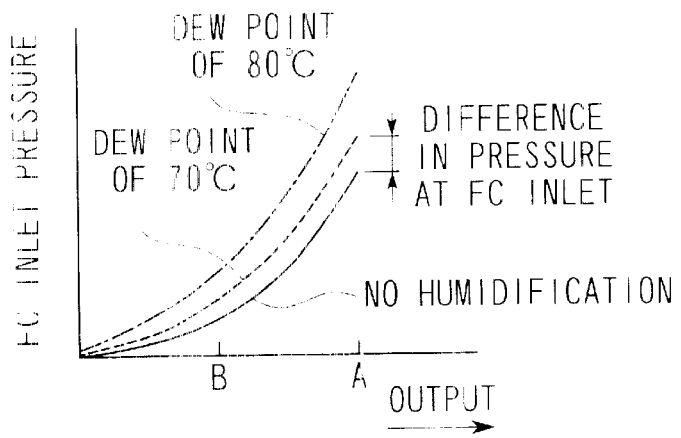
FIG. 6 is a graph showing the relationship between the pressure and the output in the third embodiment of the present invention.

Next, the second embodiment of the present invention will be explained with reference to FIG. 4.

The basic structure of the second embodiment is similar to that of the first embodiment in that the reaction gas supply passage 3 and the exhaust gas discharge passage 5 are connected to the fuel cell 1, that the humidifier 6 for supplying the moisture from the exhaust gas to the reaction gas, that the supercharger 16 and the dew point instrument 19 are provided in the reaction gas supply passage 3, and that the pressure regulating valve 18 is provided in the exhaust gas discharge passage 5.

An exhaust gas bypass passage 24 for allowing the gas to bypass the humidifier 6 is provided in the exhaust gas discharge passage 5, instead of the reaction gas bypass passage 21 in the first embodiment. A flow regulating valve 22 for regulating the amount of flow of the exhaust gas flowing through the exhaust gas bypass passage 24 is provided in the exhaust gas bypass passage 24.

According to the second embodiment, by controlling the amount of the exhaust gas flowing through the exhaust gas bypass passage 24 by the flow regulating valve 22, the amount of the humidification of the reaction gas can be controlled. That is, when the flow regulating valve 22 is closed, the amount of the exhaust gas to the humidifier 6 is increased, thereby increasing the amount of humidification. When the flow regulating valve 22 is opened, the proportion of the gas bypassing the humidifier is increased, thereby decreasing the relative amount of the exhaust gas supplied to the humidifier 6, and decreasing the amount of humidification.

Figure 3:
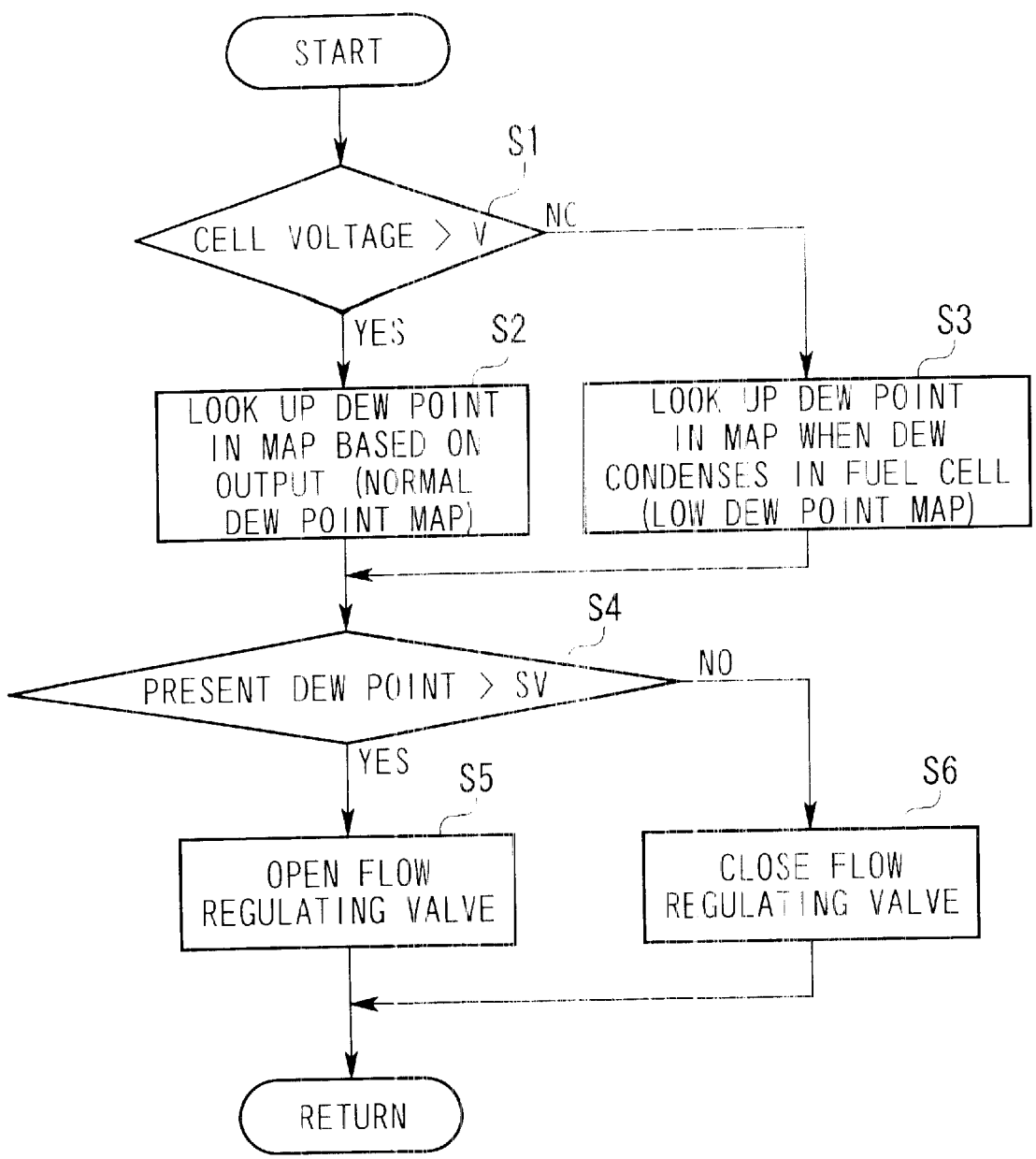
FIG. 3 is a flowchart showing the operations in the first and second embodiments of the present invention.

The flowchart of FIG. 3 explained in the description of the first embodiment can be applied to the second embodiment, except for the opening operation of the flow regulating valve 22 in step S5 and the closing operation of the flow regulating valve 22 in step S6, and is therefore referred to as the flowchart in the second embodiment.

In the second embodiment, by controlling the amount of the exhaust gas flowing through the exhaust gas bypass passage 24, the dew point of the exhaust gas flowing into the humidifier 6 can be appropriately maintained (at the requested dew point), and the fuel cell 1 is operated under optimized conditions, preventing the dew condensation in the fuel cell 1 and preventing a decrease in the generation performance.

FIGS. 5 to 8 show the third embodiment using a pressure gage 25 instead of the dew point instrument 20 in the first embodiment. The same reference numbers as in the first embodiment are employed to designate like parts and a detailed description is omitted. This invention can be applied to the second embodiment.

This embodiment uses a pressure gage 25, which is more economical than the dew point instrument. This structure will be explained with reference to FIG. 6. According to the relationships between the pressures at the gas inlet 2 of the fuel cell 1 ("FC" in FIG. 6) and its outputs, it is known that the pressure when the reaction gas is not humidified is different from the pressure of the reaction gas with the dew point of 70° C. or 80° C.

Figure 7:
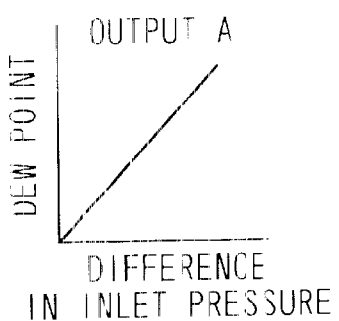
FIG. 7 is a graph showing the relationship between the dew point and the difference in pressure in the third embodiment of the present invention.
Figure 8:
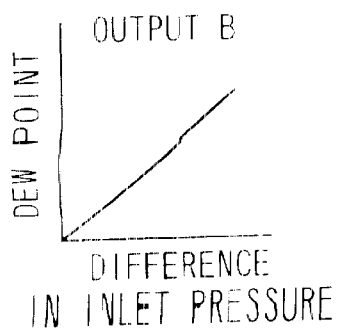
FIG. 8 is a graph showing the relationship between the dew point and the difference in pressure in the third embodiment of the present invention.

As shown in FIG. 7, the output A has a correlation between the pressure and the dew point when the gas is not humidified. As shown in FIG. 8, the output B has a correlation between the pressure and the dew point when the gas is not humidified. Accordingly, when measuring the present pressure at the gas inlet 2, the present dew point can be obtained from the relationship between the known values which are the output in the no-humidified condition, the pressure at the gas inlet 2 of the fuel cell 1, and the dew point.

Specifically, from the three dimensional map comprising the output, the pressure, and the dew point, the dew point can be determined when the pressure and the output are given.

The embodiment adds the inexpensive pressure gage to the structure of the first or second embodiment, thereby enabling the dew point control at low cost.

Although not shown in the figures, the dew point control which uses the pressure regulating valve 18 and which does not use the dew point instrument 20 will be explained.

In the above embodiments, as the reaction gas is humidified, the amount of gas flow is increased. Therefore, when the speed of rotation of the supercharger 17 is fixed, the pressure in the system may be increased. The pressure is controlled by opening or closing the pressure regulating valve 22 described in the above embodiments. From the amount of control, that is, from the degree of opening or closing of the pressure regulating valve 22, the dew point can be known. When the pressure regulating valve 22 is opened by the feedback control, the pressure is reduced because the dew point is high. That is, when the relationship between the dew point, the output, and the opening degree of the pressure regulating valve 22 is specified in a map, the dew point can be estimated based on the opening or closing amount of the pressure regulating valve 22.

Thus, the dew point control can be achieved without the dew point instrument 20. This modification can be applied to both the first and second embodiments.

The present invention is not limited to the embodiments. The present invention can be used as a humidification system for humidifying hydrogen used as fuel gas. The flow regulating valve 22 may be provided at a different position other than the reaction gas bypass passage 21 and the exhaust gas bypass passage 24, as long as the flow regulating valve 22 can control the amount of flow of the reaction gas (in the first embodiment) or of the exhaust gas (in the second embodiment) supplied to the humidifier 6.

The fourth embodiment of the present invention will be explained in the following.

Figure 9:
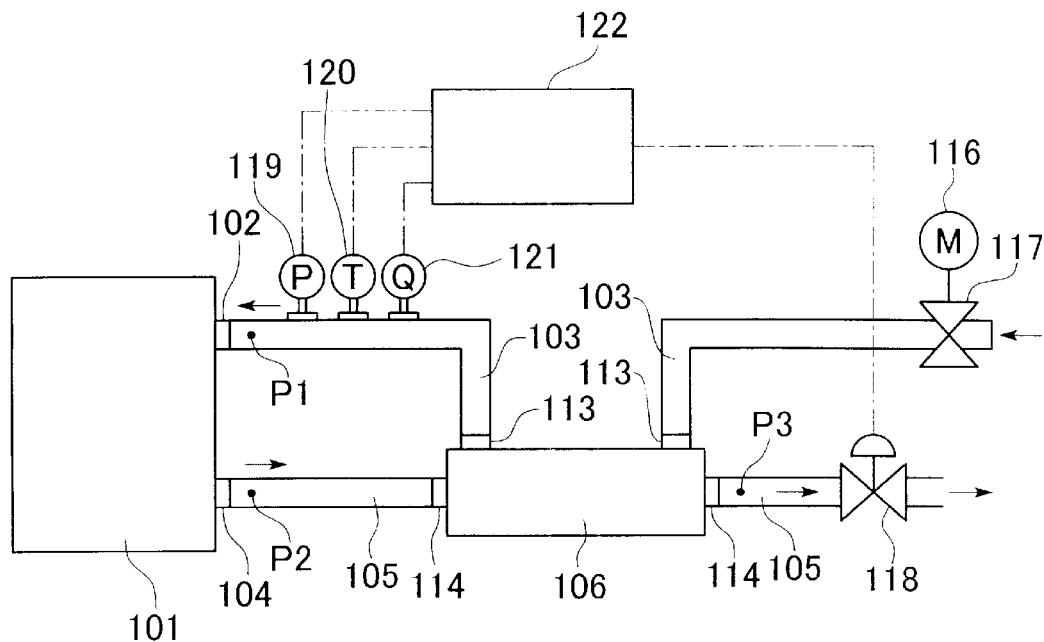
FIG. 9 is a schematic diagram showing the fourth embodiment of the present invention.
Figure 10:
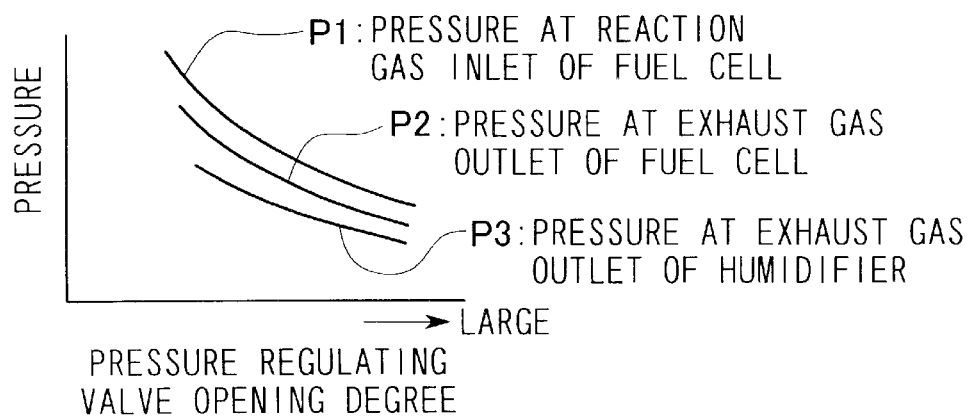
FIG. 10 is a graph showing the relationship between the opening degree of a pressure regulating valve and the pressures in the fourth embodiment of the present invention.

FIG. 9 schematically shows the fuel cell humidification system of the present invention. The fuel cell humidification system is utilized, for example, in a fuel cell vehicle.

In FIG. 9, reference numeral 101 denotes the fuel cell. The fuel cell 101 comprises a number of solid polymer membranes which function as a solid electrolyte due to proton exchange groups present in the polymer molecules when the solid polymer membranes are saturated with water, while each solid polymer membrane separating, for example, oxygen and hydrogen. The humidification system humidifies the solid polymer membranes to increase the conductivity.

A reaction gas supply passage 103 for supplying reaction gas used in the reaction (air, or hydrogen gas) is connected to a gas inlet 102 of the fuel cell 101. An exhaust gas discharge passage 105 for exhausting the exhaust gas after the reaction from the fuel cell 1 is connected to a gas outlet 104 of the fuel cell 101. The gas used in the reaction in the fuel cell 101 is oxygen supplied with the air, or separately supplied hydrogen, and the case of using air will be explained.

The humidifier 106 for humidifying the air, which is the reaction gas, with the moisture in the exhaust gas is provided between the reaction gas supply passage 103 and the exhaust gas discharge passage 105. The humidifier 106, the reaction gas supply passage 103, and the exhaust gas discharge passage 105 constitute a humidification system.

The humidifier 106 in this embodiment has the same structure as that shown in FIG. 2 in the first embodiment.

As shown in FIG. 9, a supercharger 117 driven by a motor 116 is provided in the dry air supply passage 103 upstream of the humidifier 106. This supercharger 117 is used for supplying external air into the fuel cell 101. A pressure regulating valve 18 is provided in the exhaust gas discharge passage 105 at downstream of the humidifier 106. This pressure regulating valve 118 is used for regulating the pressure in the system.

A pressure gage 119, a thermometer 120, and a flow meter 121 for measuring the dry air supplied to the fuel cell 101 are provided in the reaction gas supply passage 103 between the humidifier 106 and the gas inlet 102 of the fuel cell 101.

The pressure gage 119, the thermometer 120, and the flow meter 121 are connected through the controller 122 to the pressure regulating valve 118.

As the opening degree of the pressure regulating valve 118 varies (from large to small), the pressure P1 (FC inlet pressure) at the reaction gas inlet of the fuel cell 101, the pressure P2 at the exhaust gas outlet of the fuel cell 101, and the pressure P3 at the exhaust gas outlet of the humidifier 106 vary (from low to high).

That is, by opening or closing the pressure regulating valve 118, the pressure at the reaction gas inlet can be adjusted.

According to the embodiment, when the temperature of the reaction gas supplied to the fuel cell 101 is higher than the temperature of the exhaust gas exhausted from the fuel cell 101, the temperature of the reaction gas through the humidifier is decreased by the heat exchange with the exhaust gas. When the temperature of the reaction gas supplied to the fuel cell 101 is lower than the temperature of the exhaust gas exhausted from the fuel cell 101, the temperature of the reaction gas through the humidifier 106 is increased by the heat exchange with the exhaust gas. Accordingly, the temperature of the reaction gas can be brought close to the temperature suitable for the reaction. As the result, while the humidifier 106 humidifies the reaction gas using the exhaust gas, the temperature of the exhaust gas can be brought close to a suitable condition. Because the humidifier 106 is effectively utilized, the weight of the vehicle is not significantly increased, and the space required for the system can be decreased, as compared with a system with a heat exchanger and a radiator fan.

Figure 11:
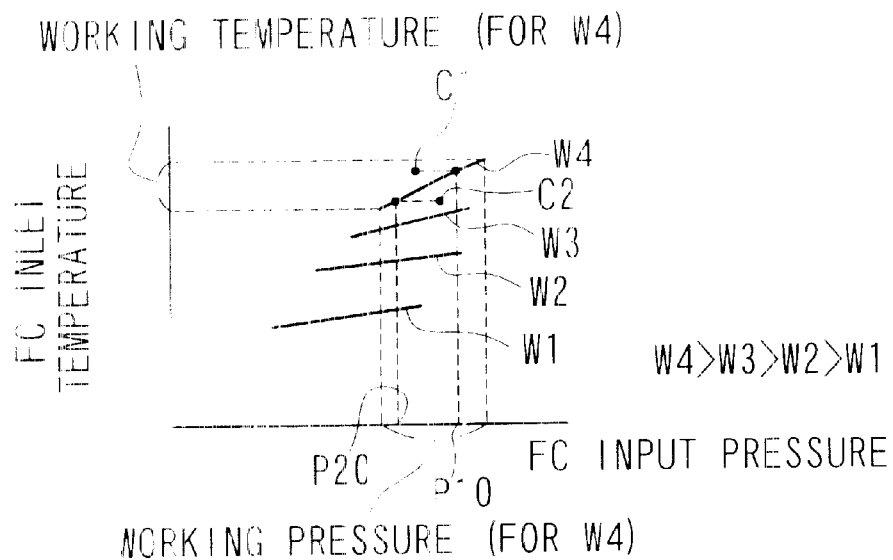
FIG. 11 is a graph showing the relationship between the FC (fuel cell) inlet temperature and the FC inlet pressure in the fourth embodiment of the present invention.

As shown in FIG. 11, there is a correlation between the temperature (FC inlet temperature) at the inlet of the reaction gas to the fuel cell 101 and the pressure (FC inlet pressure) at the inlet of the reaction gas to the fuel cell 101. The correlation may vary depending on the output from the fuel cell 101. For example, when the outputs are W1<W2<W3<W4, as the FC inlet pressures are increased, the FC inlet temperatures are increased. The reason for this relationship is that, as the pressure is increased, the resistance is increased, the flow velocity is accordingly decreased, and the efficiency of the heat exchange in the humidifier 106 is increased. As the output is increased, the inclination of the line in the graph is increased, and the FC inlet temperature is increased.

Although the output continuously varies from W1 to W2, and only four outputs are shown in the graph for illustration reasons, other output lines actually exist between these output lines.

For example, when the output W4 is required, and when the temperature measured by the thermometer 120 is C1 which is above the line W4, the pressure is increased to the FC input pressure P10 so as to change the temperature C1 so as to be on the line W4 by closing the pressure regulating valve 118 by means of the controller 122, and the required output W4 can be obtained.

When the temperature measured by the thermometer 120 is C2 which is below the line W4 in FIG. 11, the pressure is decreased to the FC input pressure 120 so as to change the temperature C2 so as to be on the line by means of the controller 118, and thus the required output W4 can be obtained. Thus, by changing the FC input pressure, the FC input temperature can be suitably maintained, thereby obtaining the required output from the fuel cell 101.

As a result, in addition to the adjustment of the temperature of the reaction gas by the heat exchange by the humidifier 106, the adjustment of the inlet pressure by means of the pressure regulating valve 118 controlled by the controller 122 enables fine temperature control.

Figure 12:
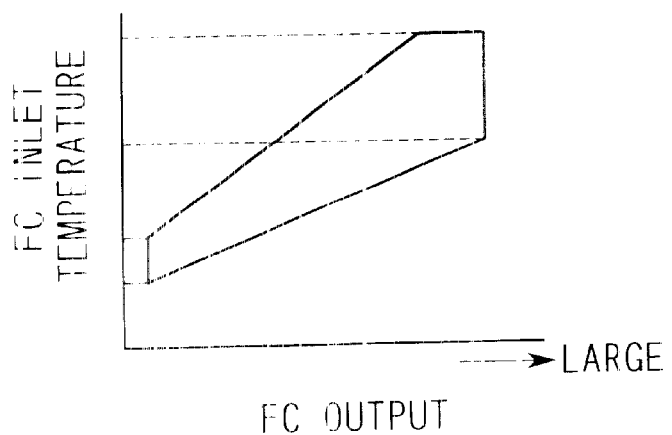
FIG. 12 is a graph showing the relationship between the FC inlet pressure and the FC output in the fourth embodiment of the present invention.

Since the fuel cell 101 has an allowable range of the FC inlet pressure depending on the FC output as shown in FIG. 12, the fine adjustment of the FC inlet pressure within the area enclosed in this graph does not adversely affect the fuel cell 101.

While in the fourth embodiment the opening degree of the pressure regulating value 118 is controlled by the controller 122 using the thermometer 120 and the pressure gage 119, the opening degree of the pressure regulating valve 118 can be controlled by the controller 122 using the thermometer 120 and the flow meter 121 as shown in FIG. 9. In this case, in order to decrease the FC inlet temperature, the amount of flow is decreased by closing the pressure regulating valve 118 to increase the heat exchange efficiency of the humidifier 106. In order to increase the FC inlet temperature, the amount of flow is increased by opening the pressure regulating valve 118 to decrease the heat exchange efficiency of the humidifier 106.

Next, the fifth embodiment of the present invention will be explained with reference to FIG. 13.

Figure 13:
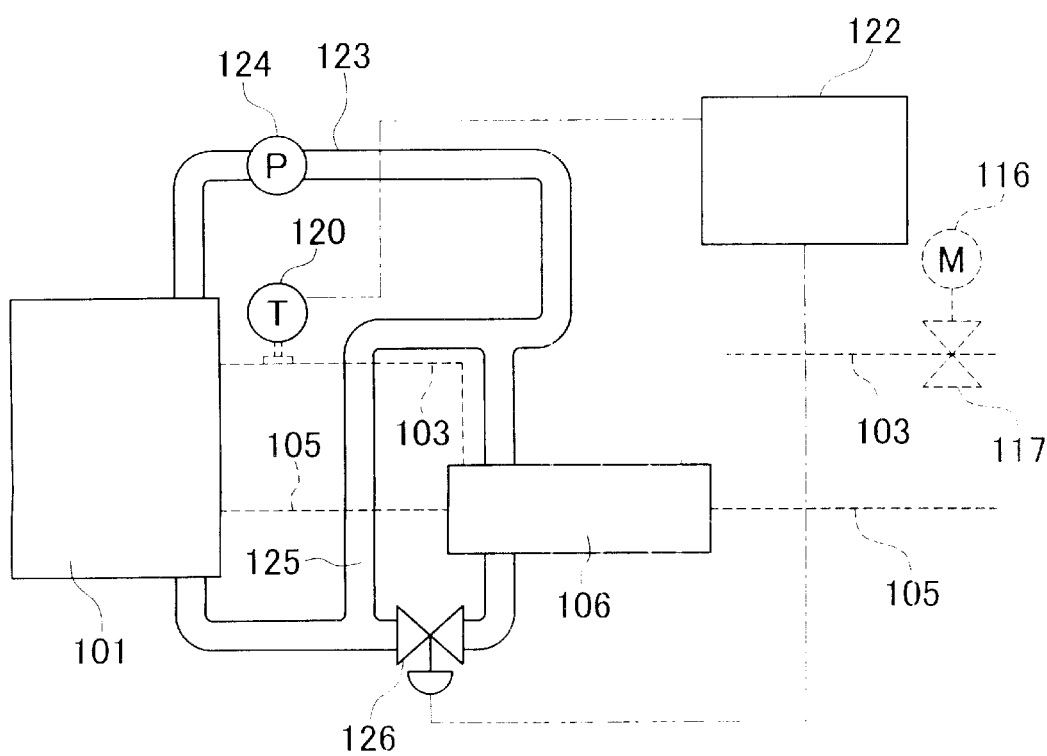
FIG. 13 is a schematic diagram showing the fifth embodiment of the present invention.

In FIG. 13, the basic structure of the fifth embodiment is similar to that of the fourth embodiment in that the reaction gas supply passage 103 and the exhaust gas discharge passage 105 are connected to the fuel cell 101, that the humidifier 106 for supplying the moisture from the exhaust gas to the reaction gas, that the supercharger 117 is provided in the reaction gas supply passage 103, and that the thermometer 120 is provided.

In the embodiment, a cooling water pipe 123 circulating from the fuel cell 1 through the humidifier 106 is provided. A pump 124 circulates water from the fuel cell 101 through the humidifier 106 so as to maintain the same temperature of the humidifier 106 as that of the fuel cell 101. The cooling water pipe 123 passes through the heads 112 and the cover 115 shown in FIG. 2.

By heating the humidifier to a temperature close to that in the fuel cell 101, the temperature of the reaction gas heated by the exhaust gas in the humidifier 106 can be brought close to the reaction temperature. The cooling water pipe 123 has a bypass passage 125, and a flow regulating valve 126 provided in the cooling water pipe 123 controls the flow of the cooling water through the bypass passage 125. This enables the fine control of the temperature of the cooling water supplied to the humidifier 106. In this embodiment, the thermometer 120 and the flow regulating valve 126 are connected to the controller 122.

According to the embodiment, when the temperature of the reaction gas supplied to the fuel cell 101 is higher than the temperature of the exhaust gas exhausted from the fuel cell 101, the temperature of the reaction gas through the humidifier is decreased by the heat exchange with the exhaust gas. When the temperature of the reaction gas supplied to the fuel cell 101 is lower than the temperature of the exhaust gas exhausted from the fuel cell 101, the temperature of the reaction gas through the humidifier 106 is increased by the heat exchange with the exhaust gas. Accordingly, the temperature of the reaction gas can be brought close to the temperature suitable for the reaction. As a result, while the humidifier 106 humidifies the reaction gas using the exhaust gas, the temperature of the exhaust gas can be brought close to a suitable condition. Because the humidifier 106 is effectively utilized, the weight of the vehicle is not significantly increased, and the space required for the system can be decreased, as compared with a system with a heat exchanger and a radiator fan.

The amount of flow of the cooling water flowing through the humidifier 106 can be decreased by closing the flow regulating valve 126 of the cooling water pipe 133. The amount of flow of the cooling water through the humidifier 106 can be increased by opening the flow regulating valve 126. Thus, the control of the temperature of the humidifier 106 contributes to the fine temperature control for controlling the temperature of the reaction gas which undergoes the heat exchange in the humidifier 106. That is, when the temperature of the reaction gas is higher than that of the exhaust gas from the fuel cell 101, the amount of flow of the cooling water supplied to the humidifier 106 is increased by opening the flow regulating valve 126. When the temperature of the reaction gas is lower than that of the exhaust gas from the fuel cell 101, the amount of flow of the cooling water supplied to the humidifier 106 is decreased by closing the flow regulating valve 126.

As a result, in addition to the adjustment of the temperature of the reaction gas by the heat exchange by the humidifier 106, the adjustment of the temperature of the humidifier 106 by means of the flow regulating valve 126 controlled by 122 enables the fine temperature control. Because the cooling water pipe 123 may be small since it does not require a large amount of flow, the weight of the vehicle is not significantly increased, and the space required for the system can be decreased.

The present invention is not limited to the above embodiments. The present invention can be used as a humidification system for humidifying hydrogen used as fuel gas. Further, the flow regulating valve 126 of the fifth embodiment may be provided in the bypass passage 125 as long as the flow regulating valve 126 can control the amount of flow of the cooling water supplied to the humidifier 106.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A humidification system for humidifying a fuel cell, comprising
    a water-permeable humidifier for humidifying reaction gas used in a reaction with moisture in an exhaust gas exhausted after the reaction; and
    an adjuster for adjusting a humidification amount to the humidification amount required by the fuel cell.

2. A humidification system according to claim 1, further comprising:

a gas bypass passage for allowing the reaction gas to bypass the humidifier.

3. A humidification system according to claim 2, further comprising:

a gas flow adjuster, provided in the gas bypass passage, for controlling a gas flow amount.

4. A humidification system according to claim 2, further comprising:

a reaction gas supply passage from the humidifier to the fuel cell, wherein the gas bypass passage is connected to the reaction gas supply passage to allow reaction gas to bypass the humidifier.

5. A humidification system according to claim 2 further comprising:

an exhaust gas discharge passage from the fuel cell through the humidifier, wherein the gas bypass passage is connected to the exhaust gas discharge passage to allow exhaust gas to bypass the humidifier.

6. A humidification system according to claim 3, further comprising a dew point instrument for measuring a dew point, wherein the gas flow adjuster adjusts the amount of gas flow based on the dew point measured by the dew point instrument.

7. A humidification system according to claim 1 further comprising:

a pressure gage for measuring a pressure of the gas; and a dew point calculator for calculating a dew point based on a map representing a relationship between an output, a pressure, and a dew point, wherein the gas flow adjuster adjusts the gas flow amount based on the dew point calculated by the dew point calculator.

8. A humidification system for humidifying a fuel cell, comprising:

a humidifier for extracting moisture from gas exhausted from the fuel cell and for supplying the moisture to inlet gas for operating the fuel cell; and an adjuster for increasing the temperature of the gas by increasing the pressure or reducing the flow, or reducing the temperature of the gas by reducing the pressure or increasing the flow, to control the temperature of the inlet gas.

9. A humidification system according to claim 8 further comprising:

a thermometer for measuring a temperature of the gas, wherein the adjuster adjusts the pressure or flow of the gas based on the temperature measured by the thermometer and on the output from the fuel cell.

10. A humidification system according to claim 8 for humidifying a fuel cell, comprising:

a humidifier for extracting moisture from gas exhausted from the fuel cell and for supply the moisture to inlet gas for operating the fuel cell;

a cooling water pipe circulating through the humidifier; and an adjuster for adjusting an amount of flow of cooling water flowing through the cooling water pipe.

11. A humidification system according to claim 10 further comprising:

a thermometer for measuring a temperature of the gas, wherein the adjuster adjusts the amount of flow of the cooling water based on the temperature measured by the thermometer and on the output from the fuel cell.

* * * * *